United States Patent [19]
Biggs

[11] 3,911,393
[45] Oct. 7, 1975

[54] VEHICLE SPEED SAFETY SIGNAL SYSTEM

[76] Inventor: Edward H. Biggs, Bishop Trailer Court, Rte. 1, Slidell, La. 70458

[22] Filed: Oct. 10, 1973

[21] Appl. No.: 405,001

[52] U.S. Cl. .............. 340/62; 200/83 A; 200/83 N; 340/66; 340/262
[51] Int. Cl.² ..................... B60Q 1/54; H01H 35/34
[58] Field of Search .......... 340/62, 60, 66, 71, 262; 200/61.6, 82 D, 82 A, 83 A, 83 N, 83 J, 83 SA

[56] References Cited
UNITED STATES PATENTS

| | | | |
|---|---|---|---|
| 1,946,759 | 2/1934 | Preston et al. | 340/71 |
| 2,169,088 | 8/1939 | Carter | 200/83 N |
| 2,250,133 | 7/1941 | Pearce et al. | 340/66 |
| 2,421,149 | 5/1947 | Segerstad | 200/83 A |
| 3,109,158 | 10/1963 | Coombs | 340/66 |
| 3,268,683 | 8/1966 | Palmer | 200/83 A |

Primary Examiner—John W. Caldwell
Assistant Examiner—Joseph E. Nowicki
Attorney, Agent, or Firm—Warren H. Kintzinger

[57] ABSTRACT

A wheel speed safety signal system that includes first and second switches actuated by engine manifold pressure in response to rapid acceleration and rapid declaration, respectively. The switches may be used to activate internal monitor panel lights for advising operators of excessive deceleration or acceleration, and can be connected to a pollution control device ignitor for burning excess exhaust-carried hydrocarbons during rapid acceleration or deceleration. The switch responsive to excessive deceleration may be connected to activate a vehicle external rear warning light to advise other vehicle operators of rapid deceleration with possible imminent braking of the vehicle before the standard red braking light appears.

12 Claims, 4 Drawing Figures

U.S. Patent  Oct. 7, 1975  3,911,393
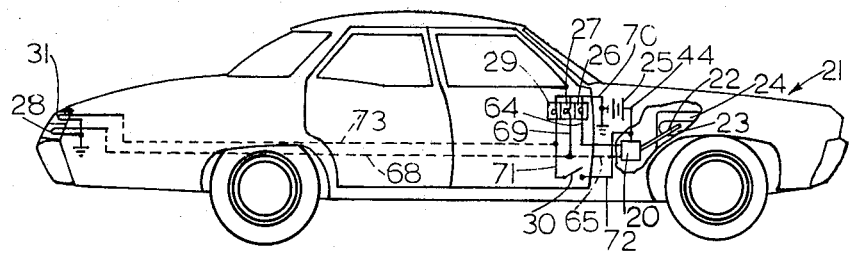
FIG. 1.
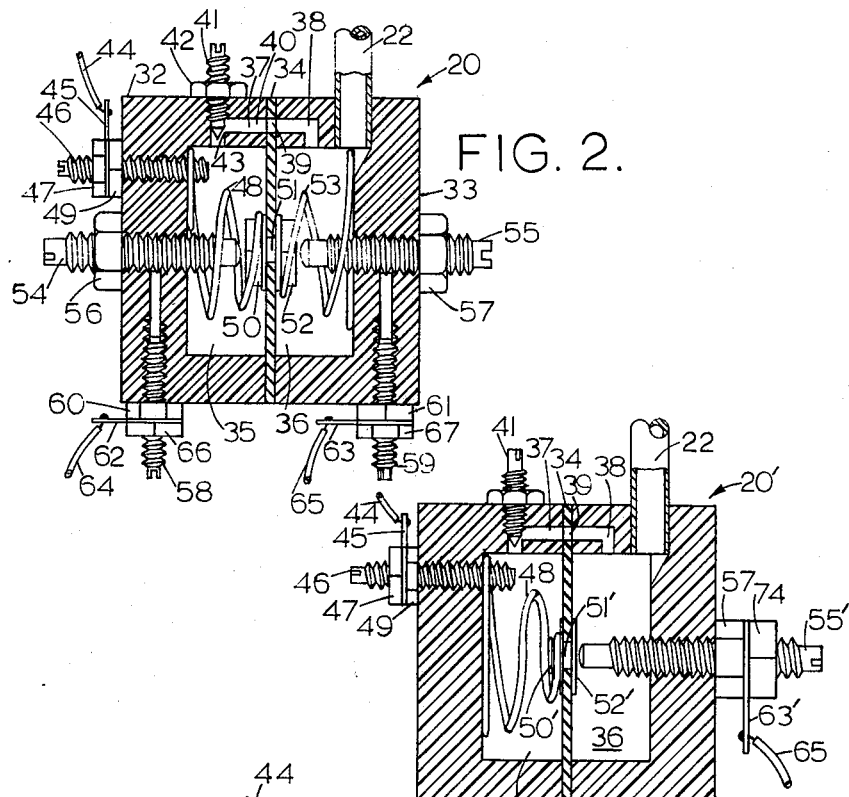
FIG. 2.
FIG. 3.
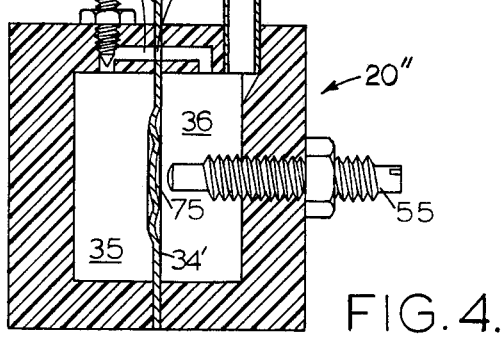
FIG. 4.

VEHICLE SPEED SAFETY SIGNAL SYSTEM

This invention relates in general to vehicle safety signaling systems and, in particular, to a vehicle speed safety signal system that is actuated by a change of the level of absolute pressure in the engine intake manifold such as occurs when a vehicle is accelerated or decelerated and that gives an immediate warning light signal to following vehicle drivers to be alert and prepared for a possible sudden stop of the vehicle ahead.

Safety devices are of ever increasing importance on modern transportation vehicles, particularly on automobiles, buses, and trucks that are frequently moving in close proximity to one another at high speeds on the roadways. The rapid acceleration or deceleration of a vehicle is often not observable by operators of other vehicles in time for them to smoothly and safely adjust the speed of their own vehicles. An indication, such as a clearly visable warning light, given simultaneously with the initiation of deceleration, as when the accelerator is released, would allow operators of other vehicles more time to appropriately adjust the speeds of their own vehicles in a smooth, safe manner, and, of course, automatically warn such operators that imminent braking of the vehicle ahead may occur.

Indicator lights located on a vehicle dashboard panel to show deceleration or, particularly, acceleration, could warn the vehicle operator that he is operating the vehicle in a potentially dangerous manner. Such panel indicator lights are especially helpful to student drivers as they learn to properly change vehicle speed.

Because vehicle engines do not operate at optimum efficiency during either rapid acceleration or deceleration, excessive amounts of unburned hydrocarbons are discharged with the engine exhaust. Driver control of the rates of of acceleration and deceleration guided by indicator lights can materially reduce the deviation from optimum efficient operation of the engine and thereby reduce the amount of pollutants expelled in the form of exhaust-carried, unburned hydrocarbons. One type of effective pollution control device that burns excess unburned hydrocarbons has an ignitor system requiring a signal input for start up when excess unburned hydrocarbons are present in the engine exhaust.

Mechanical devices switching "on" or "off" warning lights have been available for installation with the linkage of a vehicle accelerator, carburetor, or brake. These mechanical devices are subject to failure, wear and malfunction within themselves, as well as with components of the associated vehicle linkage. Warning lights, in addition to, and electrically associated with, the standard brake light system of a vehicle are sometimes used with, or independent of, the previously described mechanical devices. In either case, various relatively complex and eleborate systems of electrical components, such as switches, relays, rectifiers, electromagnets, and the like have been required. Some sensing and switching devices operated by the engine intake manifold pressure, heretofore, have been designed to operate warning light systems, but with similar limitations; and such devices do not sense and signal specific vehicle engine operating conditions beyond "running" and "not running."

It is therefore a principal object of this invention to provide a vehicle speed change safety signal system to activate selected warning indicator lights upon changing of vehicle drive power.

Another object is to provide such a system that will warn other vehicle operators that accelerator pressure has been released and that imminent braking may occur.

A further object is to provide such a system that is adjustable to actuate warning lights only at those rates of acceleration or deceleration that a warning is desired.

Another object is to provide for automatically activating a pollution control device during intervals of operation resulting in excess unburned hydrocarbon pollutants in a vehicle engine exhaust.

Still another object is to provide a sensing switch operating from engine intake manifold vacuum in an inexpensive, reliable, and simple system of warning light and pollution reduction device control.

Features of the invention useful in accomplishing the above objects include, in a vehicle speed safety signal system, a two-piece bellows and switch body having two vacuum chambers separated by a flexible diaphragm and connected by a balancing passage with a needle valve controlling the flow through the balancing passage. Adjustable set screw electric contacts extended through the walls of the switch body from the interior of respective vacuum chambers to terminals to the exterior of the body. A contact point, or points, mounted on the diaphragm engages the set screw electric contacts with limit movement of the bellows diaphragm to establish an electric current path, or paths, to the external terminal, or terminals, from the contact point, or points. A vacuum line directly interconnects the engine manifold and one enclosed vacuum chamber of the switch body. Vehicle external warning lights warn following vehicle operators of deceleration, and interior monitor panel indicator lights with associated electric wiring advise the operator of the vehicle of certain operating conditions.

Specific embodiments, representing what are presently regarded as the best modes of carrying out the invention, are illustrated in the accompanying drawing.

In the drawing:

FIG. 1 represents a side elevation view, partially broken away, of an automobile with a schematic view of a safety warning light signal system controlled by an intake manifold pressure sensing switch;

FIG. 2, a cross-sectional view of an intake manifold pressure sensing switch having contact points and coil springs on either side of a diaphragm;

FIG. 3, a cross-sectional view of an intake manifold pressure sensing switch with one contact point and one coil spring on opposite sides of the diaphragm; and, FIG. 4, a cross-sectional view intake manifold pressure sensing switch having one contact point on the diaphragm and no spring.

Referring to the drawing:

The intake manifold pressure change responsive switch 20 of FIG. 1 is shown mounted in vehicle 21 with vacuum line 22 interconnecting the intake manifold 23 of vehicle engine 24 and the switch 20, and with electric wiring interconnecting the engine battery 25, interior monitor panel indicator lights 26 and 27, and rear external warning light 28 with switch 20. An additional interior monitor panel indicator light 29 is electrically interconnected with the engine battery 25, brake light switch 30, and exterior rear brake warning light 31. In the vehicle velocity change safety signal system the rear external warning light 28 (preferred color: amber) turns on immediately upon release of foot pressure on the accelerator to give following vehicle operators advance warning of deceleration and possibly imminent braking.

The cross-sectional view of the intake manifold pressure change responsive switch 20 in FIG. 2, shows a body of rigid, electrically non-conductive material with mating halves 32 and 33, held solidly together as by four set screws (not shown), and having a cubic shape. A diaphragm 34 mounted with its fringe held in compression between body halves 32 and 33 separates cylindricallyshaped interior chambers 35 and 36 formed within the body halves. The fringe of diaphragm 34 also serves as a gasket between body halves 32 and 33 in sealing the interior chambers 35 and 36 from atmospheric pressure. A pressure balancing bleed passage 37, formed by right angled passage 38 in body half 33, hole 39, in the fringe of gasket 34, and right angled passage 40 in body half 32, is provided for controlled-flow communication between chambers 35 and 36. Here, the fringe of gasket 34 acts as a gasket around the balancing passage 37 between body halves 32 and 33. An adjustable metering needle valve 41, having lock nut 42, is threaded into a tapped opening to passage 40 and to meter flow through needle valve opening 43 integrally formed in passage 40 to provide controlled flow between the chambers 35 and 36.

Electrically positive wire 44 is connected to electric terminal connector 45 held on electric terminal set screw 46 by lock nut 47. Electric terminal set screw 46 is threaded through a tapped hole in switch body half 32 to physically contact the large-diameter end portion of coil spring 48 in chamber 35 and is held in place by lock nut 49. The small-diameter end of coil spring 48 is connected to the center of diaphragm 34 by fastener contact point member 50 assembled to a shank 51 passing through a center hole in diaphragm 34 and connected to fastener contact point member 52. An annular portion of diaphragm 34 is compressed between fastener contact point members 50 and 52 around the shank 51 as a gasket preventing fluid communication between chambers 35 and 36 through the diaphragm 34 center hole. Fastener contact point member 52 holds the small diameter end of spring 53 at the center of the diaphragm 34 while the large diameter end presses in compression against the outer end of chamber 36. Fastener contact point members 50 and 52, shank 51, coil spring 48, terminal set screw 46, lock nuts 47 and 49, and electric terminal connector 45 are each electrically conductive, so an electrically conductive path is present from electric wire 44 to the contact points 50 and 52.

Adjustable set screw 54, threaded through a tapped hole in switch body half 32 to chamber 35, is locked in selected adjusted position of contact end proximity to contact point member 50 by lock nut 56, and adjustable set screw 55, threaded through switch body half 33 to chamber 36, is locked in adjusted contact end proximity to fastener contact point 52 by lock nut 57. Electric terminal set screws 58 and 59 are threaded into drilled and partially tapped holes in body halves 32 and 33, respectively, where unthreaded end extensions of terminal set screws 58 and 59 physically establish electrical contact with set screws 54 and 55, respectively. Lock nuts 60 and 61 hold set screws 58 and 59 in place with electric terminal connectors 62 and 63 of electric lines 64 and 65, respectively, held in place thereon by lock nuts 66 and 67. Thus, electrically conductive paths are present between electric line 64 and set screw 54, and between electric line 65 and set screw 55.

The intake manifold pressure change responsive switch 20 is actuated upon the establishing of sufficient pressure differential between chambers 35 and 36. When a vehicle engine 24 is running, a pressure lower than atmospheric pressure exists in the intake manifold 23. This is commonly called manifold vacuum, with a high vacuum meaning the pressure is relatively low, and a low vacuum meaning the pressure is greater than with a high vacuum, but still lower than atmospheric pressure. With the vehicle engine 24 running, a vacuum is created in chamber 36 through fluid communication of vacuum line 22 with intake manifold 34. Pressure balancing bleed passage 37 communicates the degree of vacuum from chamber 36 to chamber 35 with the vacuum level in chambers 35 and 36 equalizing in a pressure balancing action, over a period of time-- with the elapsed time depending on the rate of flow through pressure balancing bleed passage 37 as determined by the pressure differential between chambers 35 and 36 and the adjustment position of needle valve 41. The needle valve 41 is threaded in toward needle valve opening 43 to restrict flow, and threaded out from needle valve opening 43 to allow greater flow. This balancing flow action determines the period of time that the switch 20 remains closed by contact of contact point 50 with set screw 54, or of contact point 52 with set screw 55; and thus controls the period of time that a warning light circuit is energized.

Coil springs 48 and 53 hold the diaphragm 34 in an approximately centered position between chambers 35 and 36 and limit the range of diaphragm 34 flexing with small pressure differentials consistent with minor manifold vacuum level fluctuations encountered in normal vehicle operation. More pronounced manifold vacuum level changes occur during relatively rapid vehicle and-/or engine acceleration or deceleration, resulting in switch chamber pressure differentials sufficient to flex the diaphragm 34 against a coil spring 48 or 53 toward, or to one limit or the other, as determined by the magnitude of the differential and/or settings of the set screws 54 and 55. That is, with thread set screw 54 setting in close proximity with contact point member 50 for switch 20 contact closing with rather small acceleration, and thread set screw 54 out increasingly farther away from contact point member 50 to require greater acceleration for switch 20 contact closing. The same type adjustments to set screw 55 controls switch 20 contact closing with deceleration. Another measure of control may be obtained by coil springs 48 and 53 having different sizes and spring forces, requiring greater pressure differential for movement in one direction than in the other and/or spring rate change with spring compression.

With proper settings of needle valve 41 and set screws 54 and 55, the switch 20 will, therefore, respond to activate warning and indicator lights only at desired levels of acceleration and deceleration in desired speed ranges of operation. Contact points will open by the pressure balancing action, deactivating such warning and indicator lights when steady operating conditions are established and maintained, such as when going down a long hill with the foot off the accelerator pedal. Normal minor accelerations and decelerations generally will not activate the circuits through the switch 20 for most normal sensitivity settings of the screw set contact member.

Considering FIGS. 1 and 2, together, in the usual installation of such a vehicle speed safety signal system, electric line 44 is connected to the positive side of the engine battery 25, electric line 64 is connected to grounded rear warning light 28, and electric lines 64 and 65 are connected to grounded panel indicator lights 27 and 26, respectively, and/or to a grounded pollution control device (not shown). The vehicle ignition switch (not shown) is in a series with the switch 20 so the entire vehicle speed safety signal system is operative only when the vehicle ignition is on. When the vehicle engine 24 is started, the vacuum pulled through the vacuum line 22 reduces the pressure in chamber 36 below that in chamber 35 sufficiently to cause the diaphragm 34 to flex toward set screw 55 and generally establish contact of contact point 52 with set screw 55. This completes the circuit from line 44 to line 65 and turns on amber, rear warning light 28 connected into the circuit by line 68 and amber interior monitor panel light 27 connected into the circuit by lines 69 and 70. The foregoing occurs at engine idle intake manifold vacuum of about fourteen inches on a mercury scale. If the idle condition is maintained for a sufficient period of time balancing of the pressure in chambers 35 and 36 will occur through the balancing passage 37 and the switch 20 will assume the off position, de-energizing lights 31 and 27. Normally, however, the vehicle 21 is shifted into gear or the drive mode of an automatic transmission before balancing has occurred, placing a load on the vehicle engine 24 which results in a decrease of intake manifold vacuum to about seven to nine inches on a mercury scale. The pressure in chamber 36 thus rises causing the diaphragm to move contact point 52 out of contact with set screw 55, and lights 31 and 27 go off.

Upon rapid acceleration of the vehicle, intake manifold vacuum is reduced rapidly to the full engine load level of three to five inches mercury vacuum, and the pressure in chamber 36 rises causing a flex of diaphragm 34 so that contact point 50 makes contact with the end of set screw 54. This energizes the circuit through the switch 20 from wire 44 to wire 64 and to grounded interior monitor panel light 26 (preferred color: green). The green panel light 26 is an indication to the driver, and any instructor in a driver training vehicle, that the driver is accelerating too rapidly for efficient operation of the vehicle engine 24, and perhaps too rapidly for safety.

Rapid deceleration of the vehicle 21 occurs upon release of accelerator foot pressure, unloading the engine 24, and the intake manifold vacuum increases rapidly, creating a pressure drop in chamber 36 below that in chamber 35. The diaphragm 34 flexes to cause contact point 52 to contact the end of set screw 55, establishing the circuit from electric line 44 to line 65, to turn on amber rear external warning light 28 and amber interior monitor panel light 27. Thus, with the lighting of amber rear warning light 28 immediately upon lifting the vehicle driver's foot from the accelerator, drivers of following vehicles are given warning of rapid deceleration with probable braking to follow. In many emergency situations this extra response time afforded following drivers, beyond that normally available from the standard brake application warning light 31, gives such following drivers that extra split second needed at times to apply their own brakes in time to prevent the all-too-common rear end collision. Amber panel light 27 can serve to inform the student driver, instructor, and experienced driver of deceleration at a rate that is unsafe, considering following vehicles, or that is causing unnecessary air pollution due to inefficient engine operation.

Brake indicator light 29 (suggested color: red) as an added option is connected by panel ground wire 70 to the negative terminal of battery 25, and by line 71 through normally open brake light switch 30 to the positive terminal of battery 25 with lines 72 and 44, as is rear brake application warning light 31 by wire 73. Red panel light 29 is particularly useful in a driver education vehicle to alert the student driver and the instructor to the braking condition of the vehicle 24, while rear brake application warning light 31 operates in the conventional manner to alert following vehicle operators to the braking condition.

Referring now to the alternate embodiment of FIG. 3, the safety signal switch 20' has one electric path from line 44 through to line 65 when the switch contact is closed, similar to the path from line 44 to line 65 in FIG. 2. This is with line 44 connected through terminal connector 45, lock nuts 47 and 49, terminal set screw 46, coil spring 48, fastener contact point member 50', and shank 51' to contact point surface 52'; and on through, when the switch is closed, set screw 55' to terminal connector 63' and line 65. Lock nuts 57 and 74 hold set screw 55' and connector 63' in place in a conventional manner. When no vacuum is drawn through vacuum line 22 and the pressure in chambers 35 and 36 is equalized, set screw 55' is normally positioned so that no contact is made with contact point surface 52' and the switch 20' is off. When a vacuum is rapidly applied through vacuum line 22 to chamber 36, the higher pressure in chamber 35 will flex the diaphragm 34 moving contact point surface 52' into contact with the end of set screw 55', closing the switch 20'. The rate of change of pressure in chamber 36 required to close the switch 20' is controllable by adjustment of metering needle valve 41 and set screw 55' spacing consistant with the flow through balancing passage 37, in the previously described manner. Thus, the operation and application of safety signal switch 20' is substantially the same as for safety signal switch 20 in regard to a decrease of load on the engine; that is, deceleration of a vehicle. The switch 20' normally remains open during both constant speed operation and acceleration of the vehicle 21.

In the FIG. 4 embodiment, the intake manifold pressure change responsive switch 20" electric line 44 is connected to electrically conductive material diaphragm 34' having integrally formed contact point surface 75. Set screw 55 can be wired to an output device with connections in the manner of FIG. 2 or set screw 55' of FIG. 3, and these connections can be grounded to the vehicle 21 framework with an ungrounded output deivce, or devices, series connected in line 44. The switch 20" is closed when diaphragm 34' flexing movement causes contact point surface 75 to contact the end of set screw 55. While no coil spring is used in this embodiment, the diaphragm 34' is itself a spring of resiliently deflectable conductive metal and pressure balancing bleed passage 37 with needle valve 41 is used in the same manner as in the other embodiments. The switch 20" of FIG. 4 is primarily for switch response to a decrease of engine load, just as with the switch 20' of FIG. 3; but it should be noted that, in either of these embodiments, appropriate adjustments could be made to set screw 55 or 55' to have the switch 20' or 20" closed at the vacuum level of normal engine loading and open upon a decrease in vacuum level caused by increased engine loading, as during acceleration.

Whereas this invention is herein illustrated and described with respect to a plurality of embodiments thereof, it should be realized that various changes may be made without departing from the essential contributions to the art made by the teachings hereof.

I claim:

1. In an intake manifold pressure change responsive switch: a body enclosing first and second side by side vacuum chambers; flexible diaphragm means separating said chambers and forming a wall of each said chamber; a vacuum line for communicating intake manifold vacuum to a first one of said chambers; fluid bleed passage means comprising a restricted fluid passage channel bidirectionally interconnecting said chambers for balancing fluid pressure differentials between said chambers, said restricted passage channel comprising the only fluid communications passage between said first and second chambers; first and second electric circuit contact make and break means positioned for actuation by respective deflections of said diaphragm in either direction from a neutral position thereof; and circuit means serially connectable with each of said electric circuit contact make and break means and a first terminal for conducting electric current through an activated one of said first and second circuit contact make and break means and on through switch body walls to respective second and third terminals.

2. The intake manifold pressure change responsive switch of claim 1, wherein said diaphragm means carries contact element means common to each of said first and second contact make and break means.

3. The intake manifold pressure change responsive switch of claim 2, wherein the common contact element means carried by said diaphragm means is a conductive metal surface element with each of said first and second contact make and break means comprising said common contact element means and a respective individual one of first and second switch element means mounted in respective switch body walls of said first and second vacuum chambers, said common element being connectable to one or the other of said first and second switch elements in response to pressure-differential induced movement of said diaphragm from the neutral position thereof.

4. The intake manifold pressure change responsive switch of claim 3, with conductive circuit means interconnecting said conductive metal surface element and first terminal connection means on the exterior of said body.

5. The intake manifold pressure change responsive switch of claim 4, wherein said conductive circuit means includes a coil spring; and with said coil spring contained in either one of said vacuum chambers and confinably attached between a wall of that chamber and said conduction surface element.

6. The intake manifold pressure change responsive switch of claim 5, with each of said switch element means including an electrically conductive set screw threaded through opposed walls of said switch body to extend respectively into said first and second vacuum chambers into a selected spatial relationship with said conductive metal surface element when said diaphragm is substantially in the neutral position thereof.

7. The intake manifold pressure change responsive switch of claim 6, wherein said coil spring is a variable rate spring.

8. The intake manifold pressure change responsive switch of claim 6, wherein a second coil spring is confinably attached between a vacuum chamber wall of the other one of said vacuum chambers and said conductive surface element.

9. The intake manifold pressure change responsive switch of claim 1, wherein said fluid bleed passage means includes an adjustable fluid flow rate control valve.

10. The intake manifold pressure change responsive switch of claim 9, wherein said fluid bleed passage means includes through hole means in said body interconnecting said first and second side by side vacuum chambers; and said adjustable fluid flow rate control valve is a needle valve threaded into said body to said through hole means providing variable restriction control of fluid flow rate through said through hole means.

11. The intake manifold pressure change responsive switch of claim 6, in a vehicle speed change safety signal system including, electric power means; and rear warning light means on the vehicle series connected electrically with said first terminal and that one of said second and third terminals connected to the switch element means of said first vacuum chamber.

12. The intake manifold pressure change responsive switch of claim 6, in a vehicle speed change safety signal system including, electric power means; rear warning light means; and interior monitor light means on the vehicle; and electric circuit means interconnecting said electric power means, rear warning light means and interior monitor light means with said first, second, and third terminals.

* * * * *